United States Patent [19]

Leenhouts et al.

[11] Patent Number: 5,104,569

[45] Date of Patent: Apr. 14, 1992

[54] LIQUID CRYSTALLINE MIXTURES INCLUDING 2-PHENYLPYRIDINE COMPOUNDS

[75] Inventors: Frans Leenhouts, Achel, Belgium; Alois Villiger, Basel, Switzerland

[73] Assignee: Hoffmann-La Roche Inc., Nutley, N.J.

[21] Appl. No.: 499,872

[22] Filed: Mar. 27, 1990

[30] Foreign Application Priority Data

Apr. 4, 1989 [CH] Switzerland .................. 1238/89

[51] Int. Cl.$^5$ .................. C07D 405/04; G02F 1/13
[52] U.S. Cl. .................. 252/299.61; 546/268
[58] Field of Search .................. 546/268; 252/299.61

[56] References Cited

U.S. PATENT DOCUMENTS

| | | | |
|---|---|---|---|
| 4,325,830 | 5/1982 | Sethofer | 252/299.61 |
| 4,704,227 | 11/1987 | Krause et al. | 252/299.61 |
| 4,723,018 | 2/1988 | Shionozaki et al. | 546/342 |
| 4,726,911 | 2/1988 | Kraus et al. | 546/268 |
| 4,774,020 | 9/1988 | Kitano et al. | 544/357 |
| 4,834,904 | 5/1989 | Krause et al. | 252/299.61 |
| 4,913,837 | 4/1990 | Gray et al. | 252/299.61 |

*Primary Examiner*—Jane T. Fan
*Attorney, Agent, or Firm*—George M. Gould; George W. Johnston; Ellen Ciambrone Coletti

[57] ABSTRACT

Compounds of the formula

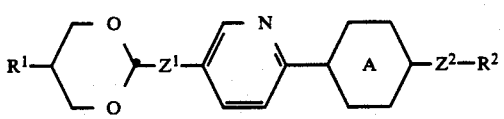

wherein $R^1$ is alkyl or alkenyl; $Z^1$ denotes a single covalent bond or —$CH_2CH_2$—; ring A represents unsubstituted or halogen- and/or methyl-substituted 1,4-phenylene; $Z^2$ denotes a single covalent bond, oxygen or —$CH_2O$—; and $R^2$ is an unsubstituted or halogen-substituted alkyl or alkenyl group, their preparation as well as liquid crystalline mixtures and their use for electro-optical purposes.

12 Claims, No Drawings

LIQUID CRYSTALLINE MIXTURES INCLUDING 2-PHENYLPYRIDINE COMPOUNDS

FIELD OF THE INVENTION

The present invention is concerned with novel 2-phenylpyridines, their preparation, liquid crystalline mixtures, especially mixtures having a tilted or chiral tilted smectic phase, which contain such compounds as well as their use for electro-optical purposes.

BACKGROUND OF THE INVENTION

Liquid crystals are suitable as dielectrics in indicating devices, since their optical properties can be influenced by an electrical potential. Suitable electro-optical devices are well-known to the person skilled in the art. Examples of such devices are cells having dynamic scattering, DAP cells (deformation of aligned phases), TN cells (twisted-nematic) and STN cells (super twisted-nematic) having a twisted nematic structure, guest-/host cells, phase-change cells having a cholesteric-nematic phase transition and SBE cells (super birefringence effect).

Further, electro-optical devices based on chiral tilted smectic liquid crystals are proposed in Appl. Phys. Lett. 36, 899 (1980) and in Recent Developments in Condensed Matter Physics 4, 309 (1981). In this case the ferroelectric properties of these materials are made use of. As the tilted smectic phases there are suitable, for example, smectic C, F, G, H, I and K phases. There are generally preferred smectic C phases which permit especially high response speeds. The chiral tilted phases are usually denoted as $S_C^*$, $S_F^*$ etc., with the asterisk indicating the chirality. Liquid crystals should have a good stability towards chemical and thermal influences and towards electric and magnetic fields. Further, they should have a suitable mesophase over a broad temperature range, low viscosity and short response times. Ferroelectric liquid crystals should preferably have a broad chiral smectic C phase and a sufficiently high spontaneous polarization. In order to facilitate the orientation in the cell, they can further preferably have a smectic A phase above the smectic C phase.

Liquid crystals are generally used as mixtures of several components in order to better optimize the various properties. Novel liquid crystal components should therefore preferably have a good miscibility with known materials.

As ferroelectric liquid crystal mixtures there are primarily suitable mixtures consisting of one or more optically active doping substances and a liquid crystal material (from one or more components) which as a rule should have a broad tilted smectic phase, preferably a smectic C phase. The optically active doping substances need not themselves be smectic, but preferably can have a smectic or cholesteric phase. However, in the liquid crystal material the optically active doping substances should produce a chiral tilted smectic phase and, further, should induce a sufficiently high spontaneous polarization and a comparatively small twisting. The pitch of the twisting should preferably be significantly larger than the plate separation of the cell which is used and typically should amount to at least about 10 μm in order to obtain bistable displays having goo switching.

SUMMARY OF THE INVENTION

The present invention concerns the compounds of formula

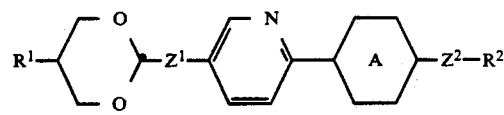

wherein $R^1$ is alkyl or alkenyl; $Z^1$ denotes a single covalent bond or —CH$_2$CH$_2$—; ring A represents a 1,4-phenylene being unsubstituted or substituted with halogen, methyl, or halogen and methyl; $Z^2$ denotes a single covalent bond, oxygen or —CH$_2$O—; and $R^2$ is an alkyl or an alkenyl, each alkyl or alkenyl independently unsubstituted or substituted with halogen.

DETAILED DESCRIPTION OF THE INVENTION

The present invention concerns the compounds of formula

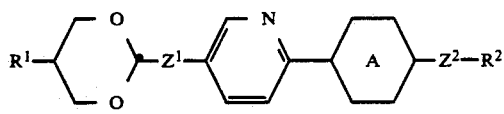

wherein $R^1$ is alkyl or alkenyl; $Z^1$ denotes a single covalent bond or —CH$_2$CH$_2$; ring A represents a 1,4-phenylene being unsubstituted or substituted with halogen, methyl, or halogen and methyl; $Z^2$ denotes a single covalent bond, oxygen or —CH$_2$O—; and $R^2$ is an alkyl or an alkenyl, each alkyl or alkenyl independently unsubstituted or substituted with halogen.

The compounds in accordance with the invention are colourless, have a high stability and have a good solubility in usual liquid crystal materials. They have a pronounced tendency to form a smectic C phase in liquid crystal mixtures and for the most part themselves have—especially when $Z^2$ is oxygen - a comparatively broad smectic C phase. Further, they have a high tendency to form a smectic A phase above the smectic C phase, whereby the orientation of the liquid crystal in the cell is facilitated considerably. Having regard to these properties, compounds which themselves have no smectic C phase or only a narrow smectic C phase are also very well suited to improve the properties of mixtures. Furthermore, the compounds in accordance with the invention have low viscosities, especially a low rotation viscosity, and accordingly give short switching times in the cell. As a result of the advantageous properties of the structures of formula I there can also be obtained by using a chiral group in $R^1$, $R^2$, or $R^1$ and $R^2$ chiral doping substances which have a very good compatibility with the liquid crystal materials and which themselves frequently have a chiral tilted smectic phase.

The term "halogen" embraces in the scope of the present invention fluorine, chlorine, bromine and iodine, especially fluorine and chlorine.

The term "unsubstituted or halogen- and/or methyl-substituted 1,4-phenylene" embraces 1,4-phenylene, 2-fluoro-1,4-phenylene, 2-chloro-1,4-phenylene, 2-bromo-1,4-phenylene, 2-iodo-1,4-phenylene, 2-methyl-1,4-phenylene, 2,3-difluoro-1,4-phenylene and the like.

The term "alkyl" embraces straight-chain and branched residues such as methyl, ethyl, propyl, butyl, pentyl, hexyl, heptyl, octyl, nonyl, decyl, undecyl, dodecyl, 1-methylheptyl (=2-octyl), 3-methylpentyl, 4-methylhexyl, 5-methylheptyl, 6-methyloctyl and the like. Alkyl residues with 1-16 carbon atoms are preferred.

The term "alkenyl" embraces straight-chain and branched residues such as vinyl, allyl, propenyl, butenyl, pentenyl, hexenyl, heptenyl, octenyl, nonenyl, decenyl, undecenyl, dodecenyl, 3,7-dimethyl-6-octenyl and the like. Alkenyl residues with 2-16 carbon atoms are preferred. The term "alkenyl" (in $R^1$ and/or $R^2$) stands especially for groups with a terminal double bond such as vinyl, allyl, 3-butenyl, 4-pentenyl, 5-hexenyl, 6-heptenyl, 7-octenyl, 8-nonenyl, 9-decenyl, 10-undecenyl, 11-dodecenyl and the like. Further, in $R^1$ the term "alkenyl" stands especially for 1E-alkenyl such as vinyl, 1E-propenyl, 1E-butenyl, 1E-pentenyl, 1E-hexenyl, 1E-heptenyl, 1E-octenyl, 1E-nonenyl, 1E-decenyl, 1E-undecenyl and 1E-dodecenyl, for 3E-alkenyl such as 3-butenyl, 3E-pentenyl, 3E-hexenyl, 3E-heptenyl, 3E-octenyl, 3E-nonenyl, 3E-decenyl, 3E-undecenyl and 3E-dodecenyl and for 4-alkenyl (preferably 4Z-alkenyl) such as 4-pentenyl, 4-hexenyl, 4-heptenyl, 4-octenyl, 4-nonenyl, 4-decenyl, 4-undecenyl and 4-dodecenyl. When $Z^2$ denotes a single covalent bond, the term "alkenyl" in $R^2$, in addition to the groups with a terminal double bond, stands especially also for 3E-alkenyl and for 4-alkenyl, for example for the 3E-alkenyl and 4-alkenyl groups referred to under $R^1$. When $Z^2$ denotes oxygen, the term "alkenyl" in $R^2$, in addition to the groups having a terminal double bond, also stands especially for 2E-alkenyl such as allyl, 2E-butenyl, 2E-pentenyl, 2E-hexenyl, 2E-heptenyl, 2E-octenyl, 2E-nonenyl, 2E-decenyl, 2E-undecenyl, 2E-dodecenyl and for 3-alkenyl (preferably 3Z-alkenyl) such as 3-butenyl, 3-pentenyl, 3-hexenyl, 3-heptenyl, 3-octenyl, 3-nonenyl, 3-decenyl, 3-undecenyl and 3-dodecenyl. When $Z^2$ denotes —CH$_2$O—, the term "alkenyl" in $R^2$, besides the groups having a terminal double bond, also stands especially for 2-alkenyl (preferably 2Z-alkenyl) such as allyl, 2-butenyl, 2-pentenyl, 2-hexenyl, 2-heptenyl, 2-octenyl, 2-nonenyl, 2-decenyl, 2-undecenyl and 2-dodecenyl.

The term "unsubstituted or halogen-substituted alkyl or alkenyl group" embraces the above-mentioned alkyl groups and alkenyl groups as well as haloalkyl or haloalkenyl groups derived therefrom such as 1-fluoroalkyl, 1-chloroalkyl, 2-fluoroalkyl, 2-chloroalkyl and the like.

Preferred compounds of formula I include those compounds in which ring A represents unsubstituted, monosubstituted or 2,3-disubstituted 1,4-phenylene (especially 1,4-phenylene, 2-fluoro-1,4-phenylene or 2,3-difluoro-1,4-phenylene). Preferred compounds in accordance with the invention are therefore the compounds of the formulas

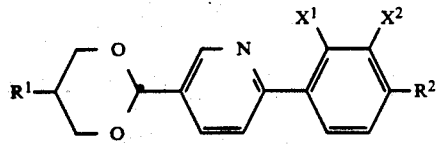

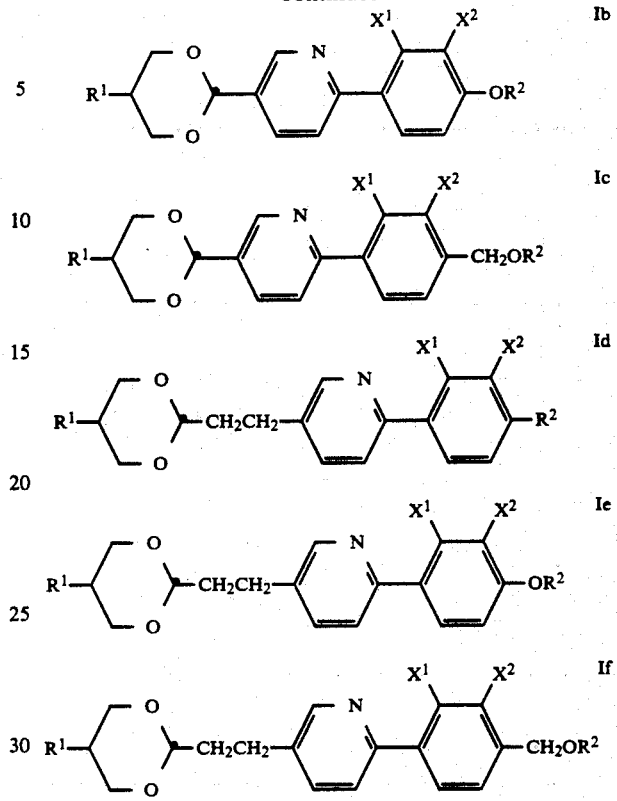

wherein $R^1$ and $R^2$ have the above significances and $X^1$ and $X^2$ each independently denote hydrogen, halogen or methyl.

Those compounds of formulas Ia-If in which $X^1$ and $X^2$ each independently are hydrogen or fluorine are especially preferred, particularly those in which $X^1$ is hydrogen and $X^2$ is hydrogen or fluorine.

The residue $R^1$ in formulas I and Ia-If above preferably has about 3-14 carbon atoms, particularly about 7-12 carbon atoms. Preferred residues $R^2$ in formulas I and Ia-If above are generally those with about 3-12 carbon atoms, especially those with about 6-10 carbon atoms. Shorter and longer chains are also suitable for the present purpose, but shorter chains can give a narrow mesophase range of the pure compound and longer chains give for the most part no improvement or only an insignificant improvement vis-a-vis the chain lengths referred to.

Preferred residues $R^1$ in formulas I and Ia-If above are 1E-alkenyl, 3E-alkenyl, alkenyl groups having a terminal double bond and especially alkyl. Straight-chain residues $R^1$ are generally preferred.

Preferred residues $R^2$ in formulas Ia and Id—and, respectively, in formulas I when $Z^2$ denotes a single covalent bond—are 3E-alkenyl, alkenyl having a terminal double bond and especially alkyl as well as corresponding haloalkenyl and haloalkyl groups, especially 1-fluoroalkyl, 1-chloroalkyl, 2-fluoroalkyl and 2-chloroalkyl.

Preferred residues $R^2$ in formulas Ib and Ie—and, respectively, in formulas I when $Z^2$ is oxygen —are 2E-alkenyl and especially alkenyl with a terminal double bond and alkyl as well as corresponding haloalkenyl and haloalkyl groups, especially 2-fluoroalkyl and 2-chloroalkyl.

Preferred residues $R^2$ in formulas Ic and If—and, respectively, in formulas I when $Z^2$ denotes —$CH_2O$— —are alkenyl with a terminal double bond and alkyl as well as corresponding haloalkenyl and haloalkyl groups, especially 2-fluoroalkyl and 2-chloroalkyl.

The alkyl and alkenyl groups in $R^2$ are preferably straight-chain or—especially when an optically active compound is desired—can preferably also have a methyl branching. Preferred branched groups are the methylalkyl groups, especially 1-methylalkyl (for example, 1-methylheptyl) and alkyl residues which have the grouping —$CH(CH_3)CH_2CH_3$ (for example, 4-methylhexyl, 5-methylheptyl, 6-methyloctyl).

The compounds of formula I can be prepared in accordance with the invention by reacting an aldehyde of formula

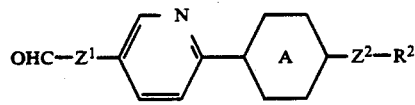

II or an acetal thereof with a compound of formula

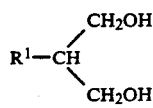

III wherein $R^1$, $R^2$, $Z^1$, $Z^2$ and ring A have the above significances.

The reaction of the aldehyde or of a suitable acetal (for example, the dimethyl acetal) with the diol of formula III can be effected in a manner known per se.

Conveniently, the reaction is effected in an inert organic solvent (for example an aromatic hydrocarbon such as benzene, toluene or xylene) in the presence of a catalytic amount of an organic or inorganic acid such as p-toluenesulfonic acid, sulfuric acid or dry hydrogen chloride. Temperature and pressure are not critical, but the reaction is preferably carried out at reflux temperature (with separation of the water which is formed) and atmospheric pressure.

Compounds of formula I in which $Z^2$ denotes oxygen or —$CH_2O$ — and $R^2$ is alkenyl or a halogen-substituted group can preferably also be obtained via compounds of formula I or II in which $R^2$ is alkyl by dealkylation and subsequent etherification with the desired group. This trans-etherification can be effected before or after the linkage to the dioxane. Suitable methods are known to the person skilled in the art, for example, from Synthesis 1988, 749 and the literature cited therein.

The starting materials of formula III are known compounds or analogues of known compounds. Suitable methods for the preparation of these compounds are known to be person skilled in the art, for example, from U.S. Pat. No. 4,565,425 and U.S. Pat. No. 4,676,604 corresponding to EP-A-0122389, U.S. Pat. No. 4,621,901 and U.S. Pat. No. 4,709,030 corresponding to EP-A-0167912, EP-A-0168683 and EP-A-0169327.

The preparation of the aldehydes of formula II is illustrated on the basis of the following Reaction Schemes in which THPO denotes tetrahydro-2-pyranyloxy and $R^2$, $Z^2$ and ring A have the above significances:

SCHEME 1

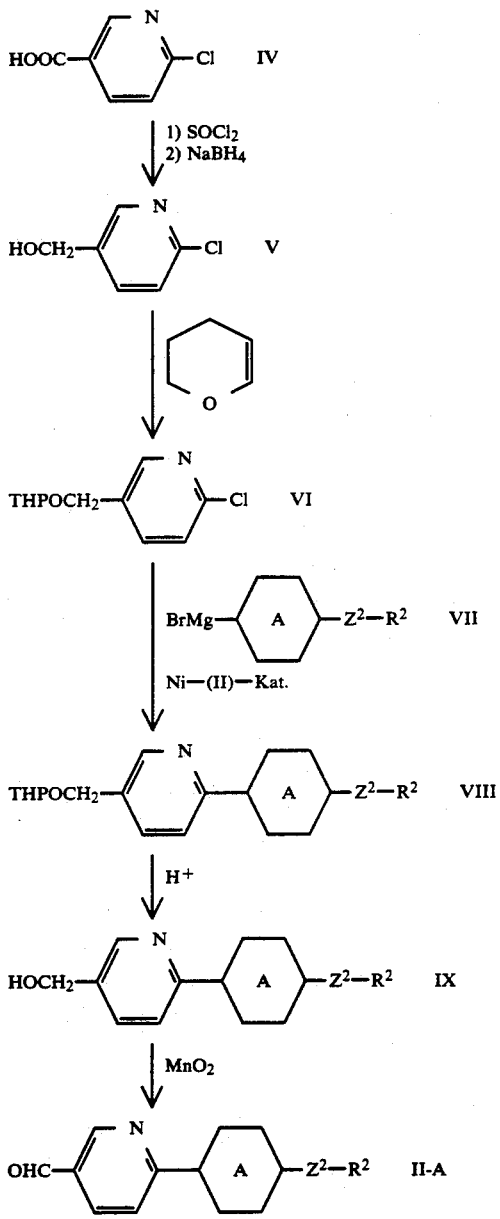

SCHEME 2

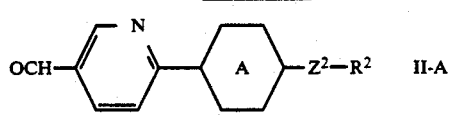

-continued
Scheme 2

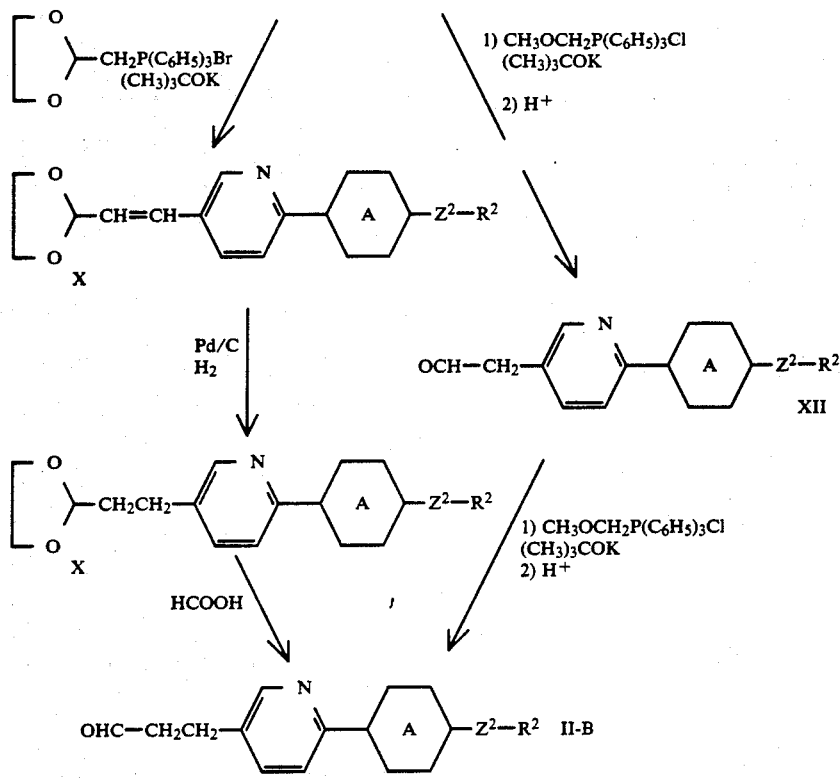

The starting materials of formulas IV and V are known. The Grignard compounds of formula VII and, respectively, the corresponding bromobenzenes are known compounds or analogues of known compounds. 1,3-Bis(diphenylphosphino)-propanenickel-(II) chloride is, for example, a suitable nickel catalyst for the conversion of the compound of formula VI. When $R^2$ has a double bond or a halogen substituent, the chain-lengthening according to Scheme 2 is conveniently effected via a compound of formula XII in order to avoid a possible reduction.

The compounds in accordance with the invention can be used in the form of mixtures with one another and/or with other liquid crystal components. Suitable liquid crystal components are known in large numbers by the person skilled in the art, for example, from D. Demus et al., Flüssige Kristalle in Tabellen, VEB Deutscher Verlag für Grundstoffindustrie, Leipzig, volumes I and II, and many of them are, moreover, commercially available.

The invention is accordingly also concerned with a liquid crystalline mixture having at least 2 components, wherein at least one component is a compound of formula I (especially one of the compounds referred to as being preferred). The compounds of formula I are also suitable for nematic or cholesteric mixtures. However, mixtures having a tilted smectic phase, especially mixtures having a chiral tilted smectic phase, are preferred. The tilted or chiral tilted phase is preferably a smectic C phase. The chiral tilted smectic mixtures can preferably also consist of one or more optically active doping substances and a liquid crystal material (consisting of one or more components) having a tilted smectic phase and are characterized in that at least one component of the liquid crystal material is a compound of formula I.

Having regard to the advantageous properties, the amount of compounds of formula I in the mixtures in accordance with the invention can vary in a wide range and can amount to, for example, about 0.5–60 wt. % or more. In general, an amount of about 3–40 wt. %, especially about 10–30 wt. %, of compounds of formula I is preferred. The amount of chiral doping substances of formula I can, however, preferably also be lower and can amount to, for example, about 0.5–10 wt. %.

The mixtures in accordance with the invention for smectic applications (especially for tilted smectic or chiral tilted smectic phases) preferably contain, in addition to one or more compounds of formula I, one or more compounds from the group of compounds of the formulas

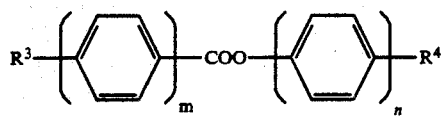

XIII

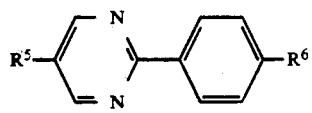 XIV

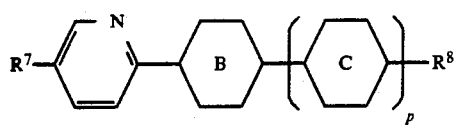 XV

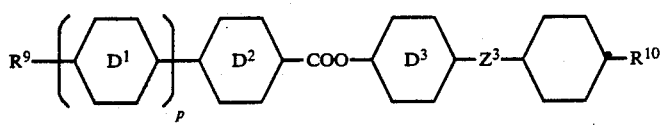 XVI

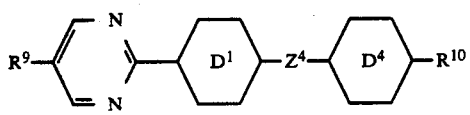 XVII

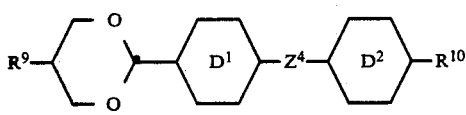 XVIII

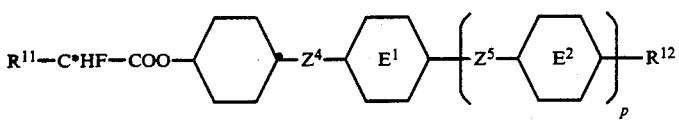 XIX

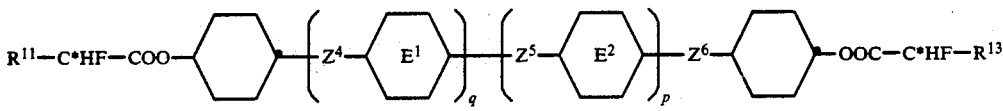 XX wherein $R^3$ and $R^4$ denote alkyl, alkoxy, alkenyloxy, alkanoyloxy or alkoxycarbonyl with up to 18 carbon atoms; m and n each independently are 1 or 2; $R^5$ and $R^6$ denote alkyl, alkoxy or alkenyloxy with up to 18 carbon atoms; ring B is 1,4-phenylene, the 1,4-phenylene being unsubstituted or substituted with halogen, methyl or halogen and methyl; ring C represents trans-1,4-cyclohexylene or 1,4-phenylene, the 1,4-phenylene being unsubstituted or substituted with halogen, methyl or halogen and methyl; p and q each independently stand for the number 0 or 1; $R^7$ and $R^8$ each independently denote an unsubstituted or halogen substituted $C_1$-$C_{18}$-alkyl or $C_2$-$C_{18}$-alkenyl group, the $C_1$-$C_{18}$-alkyl or $C_2$-$C_{18}$-alkenyl group having none of its carbons replaced or having one $CH_2$ group or two non-adjacent $CH_2$ groups independently replaced by —O—, —COO— or —OOC—; rings $D^1$, $D^2$ and $D^3$ each independently represent 1,4-phenylene, the 1,4-phenylene being unsubstituted or substituted with cyano, halogen or lower alkyl; $Z^3$ denotes a single covalent bond, —$CH_2CH_2$—, —$OCH_2$—, —COO— or —OOC—; $R^9$ and $R^{10}$ each independently are an unsubstituted or halogen-substituted $C_1$-$C_{18}$-alkyl or $C_2$-$C_{18}$-alkenyl group. the $C_1$-$C_{18}$-alkyl or $C_2$-$C_{18}$-alkenyl having none of its carbons replaced or having one $CH_2$ group or two non-adjacent $CH_2$ groups replaced by oxygen; ring D4 represents trans-1,4-cyclohexylene or 1,4-phenylene, the 1,4-phenylene being unsubstituted or substituted with cyano, halogen or lower alkyl; $Z^4$, $Z^5$ and $Z^6$ each independently denote a single covalent bond, —COO—, —OOC—, —$CH_2CH_2$—, —$OCH_2$— or —$CH_2O$—; $R^{11}$ and $R^{13}$ and each independently are a $C_1$-$C_{15}$-alkyl or a $C_2$-$C_{15}$-alkenyl group, the $C_1$-$C_{15}$-alkyl or $C_2$-$C_{15}$-alkenyl group having none of its carbons replaced or having one $CH_2$ group replaced by oxygen; $R^{12}$ denotes an unsubstituted or halogen-substituted $C_1$-C15-alkyl or $C_2$-$C_{15}$-alkenyl group, the $C_1$-$C_{15}$-alkyl or $C_2$-$C_{15}$-alkenyl group having none of its carbons replaced or having one $CH_2$ group replaced by oxygen or having the one $CH_2$ group replaced by an ester group —COO— or —OOC—, or having the one $CH_2$ group replaced by oxygen and one $CH_2$ group replaced by an ester group —COO— or —OOC—; rings $E^1$ and $E^2$ each independently represent 1,4-phenylene, the 1,4-phenylene being unsubstituted or substituted with halogen, cyano, or methyl and the 1,4-phenylene having none of its CH groups replaced, or having one CH group or two CH groups replaced by nitrogen; and C* denotes a chiral carbon atom.

The preparation of the liquid crystalline mixtures and of the electro-optical devices can be effected in a manner known per se.

The invention is illustrated further by the following Examples. The optical antipodes of chiral compounds have in each case the same phase transition temperatures and absolutely the same values of twisting, but with opposite signs. The abbreviations used for the characterization of the phase transitions have the following significances:

C stands for crystalline
S stands for smectic
$S_A$, $S_B$, $S_C$ stand for smectic A, B, C etc.
$S_C{}^*$, $S_F{}^*$ stand for chiral smectic C, F etc.
N stands for nematic
N* stands for cholesteric
I stands for isotropic.

EXAMPLE 1

A solution of 2.2 g of 6-[4-(octyloxy)phenyl]-3-pyridinecarboxaldehyde (prepared in accordance with Example 2) and 1.4 g of 2-decyl-1,3-propanediol in 40 ml of toluene was treated with 5 drops of 10 percent (v/v) sulfuric acid. The mixture was heated to boiling for 1 hour, moist toluene being distilled off and being replaced by fresh toluene. The reaction mixture was then neutralized with triethylamine and, after cooling, washed three times with water, dried over sodium sulfate and concentrated. Chromatographic purification of the residue on 60 g of silica gel with hexane/ethyl acetate (vol. 9:1) and repeated recrystallization of the trans/cis mixture from ethyl acetate gave 0.56 g of pure 5-(trans-5-decyl-1,3-dioxan-2-yl)-2-[4-(octyloxy)-phenyl]pyridine; m.p. (C-S) 69.7° C., transition S-SC 137.5° C., cl.p. ($S_C$-I) 179° C.

The following compounds can be prepared in an analogous manner:

5-(trans-5-Octyl-1,3-dioxan-2-yl)-2-[4-(hexyloxy)-phenyl]pyridine;
5-(trans-5-nonyl-1,3-dioxan-2-yl)-2-[4-(hexyloxy)-phenyl]pyridine;
5-(trans-5-decyl-1,3-dioxan-2-yl)-2-[4-(hexyloxy)-phenyl]pyridine;
5-(trans-5-dodecyl-1,3-dioxan-2-yl)-2-[4-(hexyloxy)-phenyl]pyridine;
5-(trans-5-heptyl-1,3-dioxan-2-yl)-2-[4-(heptyloxy)-phenyl]pyridine;
5-(trans-5-octyl-1,3-dioxan-2-yl)-2-[4-(heptyloxy)-phenyl]pyridine;
5-(trans-5-decyl-1,3-dioxan-2-yl)-2-[4-(heptyloxy)-phenyl]pyridine;
5-(trans-5-dodecyl-1,3-dioxan-2-yl)-2-[4-(heptyloxy)-phenyl]pyridine;
5-(trans-5-hexyl-1,3-dioxan-2-yl)-2-[4-(octyloxy)-phenyl]pyridine;
5-(trans-5-heptyl-1,3-dioxan-2-yl)-2-[4-(octyloxy)-phenyl]pyridine, m.p. (C-S) 76.1° C., S-$S_C$ 137.5° C., $S_C$-$S_A$ 169.5° C., $S_A$-N 181.5° C., cl.p. (N-I) 187° C.;
5-(trans-5-octyl-1,3-dioxan-2-yl)-2-[4-(octyloxy)-phenyl]pyridine, m.p. (C-S) 67.3° C., S-$S_C$ 139.5° C., $S_C$-$S_A$ 177° C., $S_A$-N 182° C., cl.p. (N-I) 185° C.;
5-(trans-5-nonyl-1,3-dioxan-2-yl)-2-[4-(octyloxy)-phenyl]pyridine;
5-(trans-5-dodecyl-1,3-dioxan-2-yl)-2-[4-(octyloxy)-phenyl]pyridine;
5-(trans-5-heptyl-1,3-dioxan-2-yl)-2-[4-(nonyloxy)-phenyl]pyridine;
5-(trans-5-octyl-1,3-dioxan-2-yl)-2-[4-(nonyloxy)-phenyl]pyridine;
5-(trans-5-decyl-1,3-dioxan-2-yl)-2-[4-(nonyloxy)-phenyl]pyridine;
5-(trans-5-hexyl-1,3-dioxan-2-yl)-2-[4-(decyloxy)-phenyl]pyridine;
5-(trans-5-heptyl-1,3-dioxan-2-yl)-2-[4-(decyloxy)-phenyl]pyridine;
5-(trans-5-octyl-1,3-dioxan-2-yl)-2-[4-(decyloxy)-phenyl]pyridine;
5-(trans-5-nonyl-1,3-dioxan-2-yl)-2-[4-(decyloxy)-phenyl]pyridine;
5-(trans-5-decyl-1,3-dioxan-2-yl)-2-[4-(decyloxy)-phenyl]pyridine;
5-(trans-5-[10-undecenyl]-1,3-dioxan-2-yl)-2-[4--(hexyloxy)phenyl]pyridine;
5-(trans-5-[10-undecenyl]-1,3-dioxan-2-yl)-2-[4-(octyloxy)phenyl]pyridine;
5-(trans-5-[10-undecenyl]-1,3-dioxan-2-yl)-2-[4-(decyloxy)phenyl]pyridine;
5-(trans-5-octyl-1,3-dioxan-2-yl)-2-[4-[(S)-4-methylhexyloxy]phenyl]pyridine;
5-(trans-5-decyl-1,3-dioxan-2-yl)-2-[4-[(S)-4-methylhexyloxy]phenyl]pyridine;
5-(trans-5-octyl-1,3-dioxan-2-yl)-2-[4-[(S)-5-methylheptyloxy]phenyl]pyridine;
5-(trans-5-decyl-1,3-dioxan-2-yl)-2-[4-[(S)-5-methylheptyloxy]phenyl]pyridine;
5-(trans-5-octyl-1,3-dioxan-2-yl)-2-[4-[(S)-6-methyloctyloxy]phenyl]pyridine;
5-(trans-5-decyl-1,3-dioxan-2-yl)-2-[4-[(S)-6-methyloctyloxy]phenyl]pyridine;
5-(trans-5-octyl-1,3-dioxan-2-yl)-2-[4-[(R)-2-fluorooctyloxy]phenyl]pyridine;
5-(trans-5-octyl-1,3-dioxan-2-yl)-2-[4-[(S)-2-fluorooctyloxy]phenyl]pyridine;
5-(trans-5-heptyl-1,3-dioxan-2-yl)-2-[3-fluoro-4-(hexyloxy)phenyl]pyridine;
5-(trans-5-octyl-1,3-dioxan-2-yl)-2-[3-fluoro-4-(hexyloxy)phenyl]pyridine, m.p. (C-$S_C$) 72.7° C., $S_C$-$S_A$ 146° C., cl.p. ($S_A$-I) 174.5° C.;
5-(trans-5-nonyl-1,3-dioxan-2-yl)-2-[3-fluoro-4-(hexyloxy)phenyl]pyridine;
5-(trans-5-decyl-1,3-dioxan-2-yl)-2-[3-fluoro-4-(hexyloxy)phenyl]pyridine. m.p. (C-$S_C$) 76.5° C., $S_C$-$S_A$ 159° C., cl.p. ($S_A$-I) 172.3° C.;
5-(trans-5-dodecyl-1,3-dioxan-2-yl)-2-[3-fluoro-4-(hexyloxy)phenyl]pyridine, m.p. (C-SC) 79.1° C., $S_C$-$S_A$ 160° C., cl.p. ($S_A$-I) 168.5° C.;
5-(trans-5-heptyl-1,3-dioxan-2-yl)-2-[3-fluoro-4-(heptyloxy)phenyl]pyridine;
5-(trans-5-octyl-1,3-dioxan-2-yl)-2-[3-fluoro-4-(heptyloxy)phenyl]pyridine], m.p. (C-$S_C$) 80.6° C., $S_C$-$S_A$ 145° C., cl.p. ($S_A$-I) 171° C.;
5-(trans-5-nonyl-1,3-dioxan-2-yl)-2-[3-fluoro-4-(heptyloxy)phenyl]pyridine;
5-(trans-5-decyl-1,3-dioxan-2-yl)-2-[3-fluoro-4-heptyloxy)phenyl]pyridine, m.p. (C-$S_C$) 82.3° C., $S_C$-$S_A$ 160° C., cl.p. ($S_A$-I) 169° C.;
5-(trans-5-dodecyl-1,3-dioxan-2-yl)-2-[3-fluoro-4-(heptyloxy)phenyl]pyridine, m.p. (C-$S_C$) 86.5° C., $S_C$-$S_A$ 161.5° C., cl.p. ($S_A$-I) 165° C.;
5-(trans-5-heptyl-1,3-dioxan-2-yl)-2-[3-fluoro-4-(octyloxy)phenyl]pyridine; m.p. (C-SC) 80.6° C., $S_C$-$S_A$ 111° C., cl.p. ($S_A$-I) 174.5° C.;
5-(trans-5-octyl-1,3-dioxan-2-yl)-2-[3-fluoro-4-(octyloxy)phenyl]pyridine;
5-(trans-5-nonyl-1,3-dioxan-2-yl)-2-[3-fluoro-4-(octyloxy)phenyl]pyridine;
5-(trans-5-decyl-1,3-dioxan-2-yl)-2-[3-fluoro-4-(octyloxy)phenyl]pyridine, m.p. (C-$S_C$) 77.8° C., $S_C$-$S_A$ 160.5° C., cl.p. (SA-I) 167.5° C.;
5-(trans-5-dodecyl-1,3-dioxan-2-yl)-2-[3-fluoro-4-(octyloxy)phenyl]pyridine;
5-(trans-5-octyl-1,3-dioxan-2-yl)-2-[3-fluoro-4-(decyloxy)phenyl]pyridine, m.p. (C-$S_C$) 81.4° C., $S_C$-$S_A$ 136° C., cl.p. (SA-I) 167.5° C.;

5-(trans-5-nonyl-1,3-dioxan-2-yl)-2-[3-fluoro-4-(decyloxy)phenyl]pyridine;

5-(trans-5-decyl-1,3-dioxan-2-yl)-2-[3-fluoro-4-(decyloxy)phenyl]pyridine, m.p. (C-S$_C$) 81.1° C., S$_C$-S$_A$ 158° C., cl.p. (S$_A$-I) 163.5° C.;

5-(trans-5-dodecyl-1,3-dioxan-2-yl)-2-[3-fluoro-4-(decyloxy)phenyl]pyridine, m.p. (C-S$_C$) 84.8° C., S$_C$-S$_A$ 159.5° C., cl.p. (S$_A$-I) 159.7° C.;

5-(trans-5-decyl-1,3-dioxan-2-yl)-2-[2-fluoro-4-(hexyloxy)phenyl]pyridine;

5-(trans-5-octyl-1,3-dioxan-2-yl)-2-[2-fluoro-4-(octyloxy)phenyl]pyridine;

5-(trans-5-decyl-1,3-dioxan-2-yl)-2-[2-fluoro-4-(octyloxy)phenyl]pyridine;

5-(trans-5-dodecyl-1,3-dioxan-2-yl)-2-[2-fluoro-4-(octyloxy)phenyl]pyridine;

5-(trans-5-octyl-1,3-dioxan-2-yl)-2-[2-fluoro-4-(decyloxy)phenyl]pyridine;

5-(trans-5-decyl-1,3-dioxan-2-yl)-2-[2-fluoro-4-(decyloxy)phenyl]pyridine;

5-(trans-5-octyl-1,3-dioxan-2-yl)-2-[2,3-difluoro-4-(hexyloxy)phenyl]pyridine;

5-(trans-5-decyl-1,3-dioxan-2-yl)-2-[2,3-difluoro-4-(hexyloxy)phenyl]pyridine;

5-(trans-5-dodecyl-1,3-dioxan-2-yl)-2-[2,3-difluoro-4-(hexyloxy)phenyl]pyridine;

5-(trans-5-octyl-1,3-dioxan-2-yl)-2-[2,3-difluoro-4-(heptyloxy)phenyl]pyridine;

5-(trans-5-decyl-1,3-dioxan-2-yl)-2-[2,3-difluoro-4-(heptyloxy)phenyl]pyridine;

5-(trans-5-dodecyl-1,3-dioxan-2-yl)-2-[2,3-difluoro-4-(heptyloxy)phenyl]pyridine;

5-(trans-5-octyl-1,3-dioxan-2-yl)-2-[2,3-difluoro-4-(octyloxy)phenyl]pyridine;

5-(trans-5-nonyl-1,3-dioxan-2-yl)-2-[2,3-difluoro-4-(octyloxy)phenyl]pyridine;

5-(trans-5-decyl-1,3-dioxan-2-yl)-2-[2,3-difluoro-4-(octyloxy)phenyl]pyridine;

5-(trans-5-dodecyl-1,3-dioxan-2-yl)-2-[2,3-difluoro-4-(octyloxy)phenyl]pyridine;

5-(trans-5-decyl-1,3-dioxan-2-yl)-2-[2,3-difluoro-4-(nonyloxy)phenyl]pyridine;

5-(trans-5-octyl-1,3-dioxan-2-yl)-2-[2,3-difluoro-4-(decyloxy)phenyl]pyridine;

5-(trans-5-decyl-1,3-dioxan-2-yl)-2-[2,3-difluoro-4-(decyloxy)phenyl]pyridine;

5-(trans-5-dodecyl-1,3-dioxn-2-yl)-2-[2,3-difluoro-4-(decyloxy)phenyl]pyridine;

5-(trans-5-decyl-1,3-dioxan-2-yl)-2-[3-chloro-4-(hexyloxy)phenyl]pyridine;

5-(trans-5-octyl-1,3-dioxan-2-yl)-2-[3-chloro-4-(octyloxy)phenyl]pyridine;

5-(trans-5-decyl-1,3-dioxan-2-yl)-2-[3-chloro-4-(octyloxy)phenyl]pyridine;

5-(trans-5-dodecyl-1,3-dioxan-2-yl)-2-[3-chloro-4-(octyloxy)phenyl]pyridine;

5-trans-5-octyl-1,3-dioxan-2-yl)-2-[3-chloro-4-(decyloxy)phenyl]pyridine;

5-(trans-5-decyl-1,3-dioxan-2-yl)-2-[3-chloro-4-(decyloxy)phenyl]pyridine;

5-(trans-5-decyl-1,3-dioxan-2-yl)-2-[3-methyl-4-(hexyloxy)phenyl]pyridine;

5-(trans-5-octyl-1,3-dioxan-2-yl)-2-[3-methyl-4-(octyloxy)phenyl]pyridine;

5-(trans-5-decyl-1,3-dioxan-2-yl)-2-[3-methyl-4-(octyloxy)phenyl]pyridine;

5-(trans-5-dodecyl-1,3-dioxan-2-yl)-2-[3-methyl-4-(octyloxy)phenyl]pyridine;

5-(trans-5-octyl-1,3-dioxan-2-yl)-2-[3-methyl-4-(decyloxy)phenyl]pyridine;

5-(trans-5-decyl-1,3-dioxan-2-yl)-2-[3-methyl-4-(decyloxy)phenyl]pyridine;

5-(trans-5-decyl-1,3-dioxan-2-yl)-2-[4-heptylphenyl]-pyridine;

5-(trans-5-dodecyl-1,3-dioxan-2-yl)-2-[4-heptylphenyl]-pyridine;

5-(trans-5-heptyl-1,3-dioxan-2-yl)-2-[4-octylphenyl]-pyridine, m.p. (C-S) 55.5° C., S-S$_A$ 145.7° C., cl.p. (S$_A$-I) 173.7° C.;

5-(trans-5-octyl-1,3-dioxan-2-yl)-2-[4-octylphenyl]-pyridine, m.p. (C-S) 58.8° C., S-S$_A$ 145° C. cl.p. (S$_A$-I) 171° C.;

5-(trans-5-nonyl-1,3-dioxan-2-yl)-2-[4-octylphenyl]-pyridine;

5-(trans-5-decyl-1,3-dioxan-2-yl)-2-[4-octylphenyl]-pyridine, m.p. (C-S) 64.0° C., S-S$_C$ 144.5° C., S$_C$-S$_A$ 156.5° C., cl.p. (S$_A$-I) 167° C.;

5-(trans-5-dodecyl-1,3-dioxan-2-yl)-2-[4-octylphenyl]-pyridine, m.p. (C-S) 71° C., S-S$_C$ 143.5° C., cl.p. (S$_C$-I) 165° C.;

5-(trans-5-nonyl-1,3-dioxan-2-yl)-2-[4-nonylphenyl]-pyridine;

5(trans-5-decyl-1,3-dioxan-2-yl)-2-[4-nonylphenyl]-pyridine;

5-(trans-5-dodecyl-1,3-dioxan-2-yl)-2-[4-nonylphenyl]-pyridine;

5-(trans-5-decyl-1,3-dioxan-2-yl)-2-[4-decylphenyl]-pyridine;

5-(trans-5-dodecyl-1,3-dioxan-2-yl)-2-[4-decylphenyl]-pyridine;

5-(trans-5-[10-undecenyl]-1,3-dioxan-2-yl)-2-[4-heptylphenyl]-pyridine;

5-(trans-5-[10-undecenyl)-1,3-dioxan-2-yl)-2-[4-octylphenyl]-pyridine;

5-(trans-5-decyl-1,3-dioxan-2-yl)-2-[4-(hexyloxymethyl)phenyl]pyridine;

5-(trans-5-octyl-1,3-dioxan-2-yl)-2-[3-fluoro-4-octylphenyl]pyridine;

5-(trans-5-decyl-1,3-dioxan-2-yl)-2-[3-fluoro-4-octylphenyl]pyridine;

5-(trans-5-dodecyl-1,3-dioxan-2-yl)-2-[3-fluoro-4-octylphenyl]pyridine;

5-(trans-5-octyl-1,3-dioxan-2-yl)-2-[3-fluoro-4-nonylphenyl]pyridine;

5-(trans-5-decyl-1,3-dioxan-2-yl)-2-[3-fluoro-4-nonylphenyl]pyridine, m.p. (C-S) 54.9° C., S-S$_C$ 99.7° C., S$_C$-S$_A$ 136.5° C., cl.p. (S$_A$-I) 153.5° C.;

5-(trans-5-dodecyl-1,3-dioxan-2-yl)-2-[3-fluoro-4-nonylphenyl]pyridine, m.p. (C-S) 65.1° C., S-S$_C$ 101.5° C., S$_C$-S$_A$ 142.5° C., cl.p. (S$_A$-I) 150° C.;

5-(trans-5-octyl-1,3-dioxan-2-yl)-2-[3-fluoro-4-decylphenyl]pyridine;

5-(trans-5-decyl-1,3-dioxan-2-yl)-2-[3-fluoro-4-decylphenyl]pyridine;

5-(trans-5-dodecyl-1,3-dioxan-2-yl)-2-[3-fluoro-4-decylphenyl]pyridine;

5-[2-(trans-5-octyl-1,3-dioxan-2-yl)ethyl]-2-[4-(heptyloxy)phenyl]pyridine;

5-[2-(trans-5-decyl-1,3-dioxan-2-yl)ethyl]-2-[4-(heptyloxy)phenyl]pyridine;

5-[2-(trans-5-octyl-1,3-dioxan-2-yl)ethyl]-2-[4-(octyloxy)phenyl]pyridine;

5-[2-(trans-5-nonyl-1,3-dioxan-2-yl)ethyl]-2-[4-(octyloxy)phenyl]pyridine;

5-[2-(trans-5-decyl-1,3-dioxan-2-yl)ethyl]-2-[4-(octyloxy)phenyl]pyridine;

5-[2-(trans-5-octyl-1,3-dioxan-2-yl)ethyl]-2-[4-(nonyloxy)phenyl]pyridine;
5-[2-(trans-5-decyl-1,3-dioxan-2-yl)ethyl]-2-[4-(nonyloxy)phenyl]pyridine;
5-[2-(trans-5-octyl-1,3-dioxan-2-yl)ethyl]-2-[4-(decyloxy)phenyl]pyridine;
5-[2-(trans-5-decyl-1,3-dioxan-2-yl)ethyl]-2-[4-(decyloxy)phenyl]pyridine;
5-[2-(trans-5-decyl-1,3-dioxan-2-yl)ethyl]-2-[3-fluoro-4-(heptyloxy)phenyl]pyridine;
5-[2-(trans-5-dodecyl-1,3-dioxan-2-yl)ethyl]-2-[3-fluoro-4-(heptyloxy)phenyl]pyridine;
5-[2-(trans-5-octyl-1,3-dioxan-2-yl)ethyl]-2-[3-fluoro-4-(octyloxy)phenyl]pyridine;
5-[2-(trans-5-decyl-1,3-dioxan-2-yl)ethyl]-2-[3-fluoro-4-(octyloxy)phenyl]pyridine;
5-[2-(trans-5-dodecyl-1,3-dioxan-2-yl)ethyl]-2-[3-fluoro-4-(octyloxy)phenyl]pyridine;
5-[2-(trans-5-nonyl-1,3-dioxan-2-yl)ethyl]-2-[3-fluoro-4-(decyloxy)phenyl]pyridine;
5-[2-(trans-5-decyl-1,3-dioxan-2-yl)ethyl]-2-[3-fluoro-4-(decyloxy)phenyl]pyridine, m.p. (C-S) 57.3° C., S-S 68° C., S-$S_C$ 115.7° C., cl.p. ($S_C$-I) 139.5° C.;
5-[2-(trans-5-dodecyl-1,3-dioxin-2-yl)ethyl]-2-[3-fluoro-4-(decyloxy)phenyl]pyridine, m.p. (C-S) 65.7° C., S-$S_C$ 114° C., cl.p. ($S_C$-I) 138° C.;
5-[2-(trans-5-decyl-1,3-dioxan-2-yl)ethyl]-2-[4-heptylphenyl]pyridine;
5-[2-(trans-5-dodecyl-1,3-dioxan-2-yl)ethyl]-2-[4-heptylphenyl]pyridine;
5-[2-(trans-5-decyl-1,3-dioxan-2-yl)ethyl]-2-[4-octylphenyl]pyridine;
5-[2-(trans-5-dodecyl-1,3-dioxan-2-yl)ethyl]-2-[4-octylphenyl]pyridine;
5-[2-(trans-5-nonyl-1,3-dioxan-2-yl)ethyl]-2-[4-nonylphenyl]pyridine;
5-[2-(trans-5-decyl-1,3-dioxan-2-yl)ethyl]-2-[4-nonylphenyl]pyridine;
5-[2-(trans-5-dodecyl-1,3-dioxan-2-yl)ethyl]-2-[4-nonylphenyl]pyridine;
5-[2-(trans-5-octyl-1,3-dioxan-2-yl)ethyl]-2-[4-decylphenyl]pyridine;
5-[2-(trans-5-decyl-1,3-dicxan-2-yl)ethyl]-2-[4-decylphenyl]pyridine;
5-[2-(trans-5-dodecyl-1,3-dioxan-2-yl)ethyl]-2-[4-decylphenyl]pyridine.

EXAMPLE 2 a) A mixture of 44.3 g of 6-chloro-3-pyridine-carbinol, 300 ml of dioxan and 104.3 g of 3,4-dihydro-2H-pyran was treated with 3 g of p-toluenesulfonic acid monohydrate and stirred at 55° C. for 2 hours. The reaction mixture was treated with 10 ml of diethylamine and, after cooling, taken up in diethyl ether. Repeated washing with water, drying over sodium sulfate and concentration in a vacuum yielded 87.3 g of crude 2-chloro-5-[(tetrahydro-2-pyranyloxy)methyl]pyridine.

b) A Grignard reagent solution prepared from 0.8 g of magnesium, 10.3 g of (4-bromophenyl) octyl ether and 50 ml of tetrahydrofuran was added dropwise at 0°-5° C. within 30 minutes to a mixture of 7.5 g of crude 2-chloro-5-[(tetrahydro-2-pyranyloxy)methyl]pyridine, 75 ml of tetrahydrofuran and 0.36 g of 1,3-bis(diphenylphosphino)-propanenickel-(II) chloride. The reaction mixture was stirred for 3 hours, left to stand overnight, then adjusted to pH 8 with aqueous sodium hydrogen carbonate solution and diluted with diethyl ether. The organic phase was washed neutral with water, dried over sodium sulfate and concentrated. Chromatographic purification of the residue (14.6 g) on 210 g of silica gel with hexane/ethyl acetate (vol. 4:1) yielded 8.8 g of 2-[4-(octyloxy)-phenyl]-5-[(tetrahydro-2-pyranyloxy)methyl]pyridine.

c) A solution of 8.8 g of 2-[4-(octyloxy)phenyl]-5-[(tetrahydro-2-pyranyloxy)methyl]pyridine in 150 ml of tetrahydrofuran was treated with 22 ml of 2N hydrochloric acid. The mixture was stirred at 60° C. for 6 hours, then diluted with diethyl ether, washed twice with 50 ml of saturated aqueous sodium hydrogen carbonate solution each time and three times with 75 ml of water each time, dried over sodium sulfate and concentrated. There were obtained 7.0 g of 6-[4-(octyloxy)phenyl]-3-pyridinecarbinol.

d) A solution of 7.0 g of 6-[4-(octyloxy)phenyl]-3-pyridinecarbinol in 150 ml of 1,2-dichloroethane was treated with 9.6 g of activated manganese-(IV) oxide. The suspension was heated to boiling for 4.5 hours and then filtered. Concentration of the filtrate gave 6.2 g of 6-[4-(octyloxy)phenyl]-3-pyridinecarboxyaldehyde; m.p. 90.5°-91° C.

The following compounds can be prepared in an analogous manner:

6-[4-(Hexyloxy)phenyl]-3-pyridinecarboxaldehyde;
6-[4-(heptyloxy)phenyl]-3-pyridinecarboxaldehyde;
6-[4-(nonyloxy)phenyl]-3-pyridinecarboxaldehyde;
6-[4-(decyloxy)phenyl]-3-pyridinecarboxaldehyde;
6-[4-[(S)-4-methylhexyloxy]phenyl]-3-pyridinecarboxaldehyde;
6-[4-[(S)-5-methylheptyloxy]phenyl]-3-pyridinecarboxaldehyde;
6-[4-[(S)-6-methyloctyloxy]phenyl]-3-pyridinecarboxaldehyde;
6-[4-[(R)-2-fluorooctyloxy]phenyl]-3-pyridinecarboxaldehyde;
6-[4-[(S)-2-fluorooctyloxy]phenyl]-3-pyridinecarboxaldehyde;
6-[3-fluoro-4-(hexyloxy)phenyl]-3-pyridinecarboxaldehyde;
6-[3-fluoro-4-(heptyloxy)phenyl]-3-pyridinecarboxaldehyde;
6-[3-fluoro-4-(octyloxy)phenyl]-3-pyridinecarboxaldehyde, m.p. 65.5°-66° C.;
6-[3-fluoro-4-(decyloxy)phenyl]-3-pyridinecarboxaldehyde, m.p. 53°-54.8° C.;
6-[2-fluoro-4-(hexyloxy)phenyl]-3-pyridinecarboxaldehyde;
6-[2-fluoro-4-(octyloxy)phenyl]-3-pyridinecarboxaldehyde;
6-[2-fluoro-4-(decyloxy)phenyl]-3-pyridinecarboxaldehyde;
6-[2,3-difluoro-4-(hexyloxy)phenyl]-3-pyridinecarboxaldehyde;
6-[2,3-difluoro-4-(heptyloxy)phenyl]-3-pyridinecarboxaldehyde;
6-[2,3-difluoro-4-(octyloxy)phenyl]-3-pyridinecarboxaldehyde;
6-[2,3-difluoro-4-(nonyloxy)phenyl]-3-pyridinecarboxaldehyde;
6-[2,3-difluoro-4-(decyloxy)phenyl]-3-pyridinecarboxaldehyde;
6-[3-chloro-4-(hexyloxy)phenyl]-3-pyridinecarboxaldehyde;
6-[3-chloro-4-(octyloxy)phenyl]-3-pyridinecarboxaldehyde;
6-[3-chloro-4-(decyloxy)phenyl]-3-pyridinecarboxaldehyde;

6-[3-methyl-4-(hexyloxy)phenyl]-3-pyridinecarboxaldehyde;
6-[3-methyl-4-(octyloxy)phenyl]-3-pyridinecarboxaldehyde;
6-[3-methyl-4-(decyloxy)phenyl]-3-pyridinecarboxaldehyde;
6-[4-heptylphenyl]-3-pyridinecarboxaldehyde;
6-[4-cctylphenyl]-3-pyridinecarboxaldehyde, m.p. 51.2°-52.9° C.;
6-[4-nonylphenyl]-3-pyridinecarboxaldehyde;
6-[4-decylphenyl]-3-pyridinecarboxaldehyde;
6-[4-(hexyloxymethyl)phenyl]-3-pyridinecarboxaldehyde;
6-[3-fluoro-4-octylphenyl]-3-pyridinecarboxaldehyde;
6-[3-fluoro-4-nonylphenyl]-3-pyridinecarboxaldehyde;
6-[3-fluoro-4-decylphenyl]-3-pyridinecarboxaldehyde;

EXAMPLE 3 a) A suspension of 6.44 g of (1,3-dioxolan-2-yl)-methyl-triphenylphosphonium bromide in 70 ml of diethyl ether is treated with 1.68 g of potassium t-butylate within 5 minutes while gassing with nitrogen. The orange suspension is stirred for 30 minutes, then cooled to 0° C. and treated within 10 minutes with a solution of 3.11 g of 6-[4-(octyloxy)phenyl]-3-pyridinecarboxaldehyde (prepared in accordance with Example 2) in 25 ml of diethyl ether. The reaction mixture is stirred at room temperature for a further 3 hours and then treated with 0.6 g of sodium hydrogen carbonate and with 20 ml of water. The organic phase is washed with water, dried over sodium sulfate and concentrated. The residue is taken up in hexane and 20 ml of 80 percent aqueous methanol. The phases are separated and the hexane phase is washed with 10 ml of 80 percent methanol, dried over sodium sulfate and concentrated. Chromatographic purification of the residue on 50 g of silica gel with hexane/ethyl acetate (vol. 9:1) gives 5-[2-(1,3-dioxolan-2-yl)vinyl]-2-[4-(octyloxy)phenyl]-pyridine.

b) A solution of 2.86 g of 5-[2-(1,3-dioxolan-2-yl)-vinyl]-2-[4-(octyloxy)phenyl]pyridine in 50 ml of dioxan and 1 ml of triethylamine is hydrogenated with 0.5 g of 10 percent palladium/charcoal for 2 hours. Filtration and concentration of the filtrate gives crude 5-[2-(1,3-dioxolan-2-yl)ethyl]-2-[4-octyloxy)phenyl]pyridine.

c) A solution of 2.68 g of 5-[2-(1,3-dioxolan-2-yl)-ethyl]-2-[4-octyloxy)phenyl]pyridine in 25 ml of toluene is treated with 15 ml of formic acid within 10 minutes at 0° C. while gassing with nitrogen. The two-phase mixture is stirred at room temperature overnight and then poured cautiously into 120 ml of 2N aqueous sodium carbonate solution. The mixture is extracted three times with 50 ml of diethyl ether each time. The combined extracts are washed with water, dried over sodium sulfate and filtered. Concentration of the filtrate gives 3-[6-[4-(octyloxy)phenyl]-3-pyridyl]propionaldehyde.

The following compounds can be prepared in an analogous manner:

3-[6-[4-(Heptyloxy)phenyl]-3-pyridyl]propionaldehyde;
3-[6-[4-(nonyloxy)phenyl]-3-pyridyl]propionaldehyde;
3-[6-[4-(decyloxy)phenyl]-3-pyridyl]propionaldehyde;
3-[6-[3-fluoro-4-(heptyloxy)phenyl]-3-pyridyl]propionaldehyde;
3-[6-[3-fluoro-4-(octyloxy)phenyl]-3-pyridyl]propionaldehyde;
3-[6-[3-fluoro-4-(decyloxy)phenyl]-3-pyridyl]propionaldehyde;
3-[6-(4-heptylphenyl)-3-pyridyl]propionaldehyde;
3-[6-(4-octylphenyl)-3-pyridyl]propionaldehyde;
3-[6-(4-nonylphenyl)-3-pyridyl]propionaldehyde;
3-[6-(4-decylphenyl)-3-pyridyl]propionaldehyde.

EXAMPLE 4

The use of the compounds of formula I in tilted smectic mixtures is illustrated by the following Mixture Examples. The pitch p was determined at 25° C. The switching times $\tau$ of the ferroelectric mixtures was measured in a liquid crystal cell in accordance with Appl. Phys. Lett. 36, 899 (1980) and 2 $\mu$m plate separation and at 20 V (peak-to-peak, square-wave voltage, 100 Hz) and 25° C.

MIXTURE A 6.63 wt. % of 5-heptyl-2-[p-(octyloxy)phenyl]pyrimidine,
4.50 wt. % of 5-heptyl-2-[p-(nonyloxy)phenyl]pyrimidine,
4.47 wt. % of 5-octyl-2-[p-(hexyloxy)phenyl]pyrimidine,
4.60 wt. % of 5-octyl-2-[p-(nonyloxy)phenyl]pyrimidine,
11.10 wt. % of 5-nonyl-2-[p-(hexyloxy)phenyl]pyrimidine,
22.22 wt. % of 5-nonyl-2-[p-(nonyloxy)phenyl]pyrimidine,
10.70 wt. % of 4-(decyloxy)-2,3-difluorobenzoic acid p-[2-(trans-4-pentylcyclohexyl)ethyl]phenyl ester,
4.64 wt. % of 4-(heptyloxy)-2,3-difluorobenzoic acid p-[trans-4-[(R)-2-fluorohexanoyloxy]cyclohexyl]phenyl ester,
4.29 wt. % of 4-(nonyloxy)-2,3-difluorobenzoic acid p-[trans-4-[(R)-2-fluorohexanoyloxy]cyclohexyl]phenyl ester,
3.66 wt. % of 5-(trans-5-heptyl-1,3-dioxan-2-yl)-2-(4-octylphenyl)pyridine,
3.74 wt. % of 5-(trans-5-cctyl-1,3-dioxan-2-yl)-2-(4-octylphenyl)pyridine,
1.88 wt. % of 5-(trans-5-decyl-1,3-dioxan-2-yl)-2-(4-octylphenyl)pyridine,
2.60 wt. % of 5-(trans-5-heptyl-1,3-dioxan-2-yl)-2-[4-(octyloxy)phenyl]pyridine,
3.00 wt. % of 5-(trans-5-octyl-1,3-dioxan-2-yl)-2-[4-(octyloxy)phenyl]pyridine,
3.04 wt. % of 5-(trans-5-decyl-1,3-dioxan-2-yl)-2-[4-(octyloxy)phenyl]pyridine,
4.38 wt. % of 5-(trans-5-heptyl-1,3-dioxan-2-yl)-2-[3-fluoro-4-(octyloxy)phenyl]pyridine,
4.55 wt. % of 5-(trans-5-decyl-1,3-dioxan-2-yl)-2-[3-fluoro-4-(octyloxy)phenyl]pyridine; $S_C$-$S_A$ 77° C., $S_A$-N* 87° C., cl.p. (N*-I) 98° C.; crystallization ($S_C$-C)<0° C.; p=16 $\mu$m, $\tau$=155 $\mu$s.

MIXTURE B 6.15 wt. % of 5-heptyl-2-[p-(octyloxy)phenyl]pyrimidine,
4.18 wt. % of 5-heptyl-2-[p-(nonyloxy)phenyl]pyrimidine,
4.44 wt. % of 5-octyl-2-[p-(hexyloxy)phenyl]pyrimidine, 4.28 wt. % of 5-octyl-2-[p-(nonyloxy)phenyl]pyrimidine,
10.48 wt. % of 5-nonyl-2-[p-(hexyloxy)phenyl]pyrimidine,
20.93 wt. % of 5-nonyl-2-[p-(nonyloxy)phenyl]pyrimidine,
3.89 wt. % of trans-5-heptyl-2-[4'-(10-undecenyloxy)-4-biphenylyl]-1,3-dioxane,
3.83 wt. % of trans-5-octyl-2-[4'-(10-undecenyloxy)-4-biphenylyl]-1,3-dioxane,
1.89 wt. % of trans-5-decyl-2-[4'-(10-undecenyloxy)-4-biphenylyl]-1,3-dioxane,
10.00 wt. % of 4-(decyloxy)-2,3-difluorobenzoic acid p-[2-(trans-4-propylcyclohexyl)ethyl]phenyl ester,
5.30 wt. % of 4-(heptyloxy)-2,3-difluorobenzoic acid p-[trans-4-[(R)-2-fluorohexanoyloxy]cyclohexyl]phenyl ester,
5.00 wt. % of 4-(nonyloxy)-2,3-difluorobenzoic acid p-[trans-4-[(R)-2-fluorohexanoyloxy]cyclohexyl]phenyl ester,
2.99 wt. % of 5-(trans-5-heptyl-1,3-dioxan-2-yl)-2-[4-(octyloxy)phenyl]pyridine,
3.51 wt. % of 5-(trans-5-octyl-1,3-dioxan-2-yl)-2-[4-(octyloxy)phenyl]pyridine,
3.51 wt. % of 5-(trans-5-decyl-1,3-dioxan-2-yl)-2-[4-(octyloxy)phenyl]pyridine,
4.71 wt. % of 5-(trans-5-heptyl-1,3-dioxan-2-yl)-2-[3-fluoro-4-(octyloxy)phenyl]pyridine,
4.91 wt. % of 5-(trans-5-decyl-1,3-dioxan-2-yl)-2-[3-fluoro-4-(octyloxy)phenl]pyridine, $S_C^*$-$S_A$ 80° C., $S_A$-$N^*$ 86.5° C., cl.p. ($N^*$-I) 102° C.; crystallization ($S_C^*$-C) -3° C.; p=14 μm, τ=160 μs.

MIXTURE C 4.94 wt. % of 5-heptyl-2-[p-(octyloxy)phenyl]pyrimidine,
8.33 wt. % of 5-octyl-2-[p-(hexyloxy)phenyl]pyrimidine,
7.54 wt. % of 5-octyl-2-[p-(nonyloxy)phenyl]pyrimidine,
10.71 wt. % of 5-nonyl-2-[p-(hexyloxy)phenyl]pyrimidine,
22.34 wt. % of 5-nonyl-2-[p-(nonyloxy)phenyl]pyrimidine,
6.01 wt. % of 5-[(S)-5-methylheptyl]-2-[p-(10-undecenyloxy)phenyl]pyrimidine,
9.53 wt. % of trans-5-octyl-2-[3'-fluoro-4'-(octyloxy)-4-biphenylyl]-1,3-dioxane,
5.02 wt. % of 4-(heptyloxy)-2,3-difluorobenzoic acid p-[trans-4-[(R)-2-fluorohexanoyloxy]cyclohexyl]phenyl ester,
4.82 wt. % of 4-(nonyloxy)-2,3-difluorobenzoic acid p-[trans-4-[(R)-2-fluorohexanoyloxy]cyclohexyl]phenyl ester,
1.82 wt. % of 5-(trans-5-heptyl-1,3-dioxan-2-yl)-2-(4-octylphenyl)pyridine,
1.86 wt. % of 5-(trans-5-octyl-1,3-dioxan-2-yl)-2-(4-octylphenyl)pyridine,
0.94 wt. % of 5-(trans-5-decyl-1,3-dioxan-2-yl)-2-(4-octylphenyl)pyridine,
1.74 wt. % of 5-(trans-5-heptyl-1,3-dioxan-2-yl)-2-[4-(octyloxy)phenyl]pyridine,
2.04 wt. % of 5-(trans-5-octyl-1,3-dioxan-2-yl)-2-[4-(octyloxy)phenyl]pyridine,
2.03 wt. % of 5-(trans-5-decyl-1,3-dioxan-2-yl)-2-[4-(octyloxy)phenyl]pyridine;
5.06 wt. % of 5-(trans-5-heptyl-1,3-dioxan-2-yl)-2-[3-fluoro-4-(octyloxy)phenyl]pyridine;
4.82 wt. % of 5-(trans-5-decyl-1,3-dioxan-2-yl)-2-[3-fluoro-4-(octyloxy)phenyl]pyridine; $S_C^*$-$S_A$ 76° C., cl.p. ($S_A$-I) 100° C.; crystallization ($S_C^*$-C)<0° C.

MIXTURE D 6.63 wt. % of 5-heptyl-2-[p-(octyloxy)phenyl]pyrimidine,
4.50 wt. % of 5-heptyl-2-[p-(nonyloxy)phenyl]pyrimidine,
4.47 wt. % of 5-octyl-2-[p-(hexyloxy)phenyl]pyrimidine,
4.60 wt. % of 5-octyl-2-[p-(nonyloxy)phenyl]pyrimidine,
11.10 wt. % of 5-nonyl-2-[p-(hexyloxy)phenyl]pyrimidine,
22.22 wt. % of 5-nonyl-2-[p-(nonyloxy)phenyl]pyrimidine,
2.48 wt. % of trans-5-nonyl-2-[4'-(octyloxy)-4-biphenylyl]-1,3-dioxane,
2.58 wt. % of trans-5-heptyl-2-[4'-(8-nonenyloxy)-4-biphenylyl]-1,3-dioxane,
2.47 wt.? of 4-(dodecyloxy)benzoic acid p-[2-(trans-4-pentylcyclohexyl)ethyl]phenyl ester,
4.88 wt. % of 4-(dodecyloxy)-2-fluorobenzoic acid p-[2-(trans-4-pentylcyclohexyl)ethyl]phenyl ester,
5.00 wt. % of 4-(decyloxy)-2,3-difluorobenzoic acid p-[2-(trans-4-propylcyclohexyl)ethyl]phenyl ester,
4.64 wt. % of 4-(heptyloxy)-2,3-difluorobenzoic acid p-[trans-4-[(R)-2-fluorohexanoyloxy]cyclohexyl]phenyl ester,
4.29 wt. % of 4-(nonyloxy)-2,3-difluorobenzoic acid p-[trans-4-[(R)-2-fluorohexanoyloxy]cyclohexyl]phenyl ester,
11.08 wt. % of 5-(trans-5-heptyl-1,3-dioxan-2-yl)-2-[3-fluoro-4-(octyloxy)phenyl]pyridine,
9.06 wt. % of 5-(trans-5-decyl-1,3-dioxan-2-yl)-2-[3-fluoro-4-(octyloxy)phenyl]pyridine; $S_C^*$-$S_A$ 73.5° C., $S_A$-$N^*$ 87° C., cl.p. ($N^*$-I) 95.5° C.; crystallization ($S_C^*$-C)<0° C.; τ=240 μs.

MIXTURE E 29.39 wt. % of 5-nonyl-2-[p-(hexyloxy)phenyl]pyrimidine,
29.96 wt. % of 5-nonyl-2-[p-(nonyloxy)phenyl]pyrimidine,
8.54 wt. % of 4-(nonyloxy)-2,3-difluorobenzoic acid p-[trans-4-[(R)-2-fluorohexanoyloxy]cyclohexyl]phenyl ester,
4.63 wt. % of 5-nonyl-2-(4-[(trans-4-[(R)-2-fluorohexanoyloxy]cyclohexyl]methoxy]phenyl)pyrimidine,
10.59 wt. % of trans-5-heptyl-2-[4'-(6-heptenyloxy)-4-biphenylyl]-1,3-dioxane,
7.63 wt. % of 5-(trans-5-heptyl-1,3-dioxan-2-yl)-2-[4-(octyloxy)phenyl]pyridine,
9.26 wt. % of 5-(trans-5-octyl-1,3-dioxan-2-yl)-2-[4-(octyloxy)phenyl]pyridine; $S_C^*$-$S_A$ 79° C., $S_A$-$N^*$ 91° C., cl.p. ($N^*$-I) 98° C.; τ=175 μs.

MIXTURE F (COMPARATIVE MIXTURE)

29.39 wt. % of 5-nonyl-2-[p-(hexyloxy)phenyl]pyrimidine,
29.96 wt. % of 5-nonyl-2-[p-(nonyloxy)phenyl]pyrimidine,
8.54 wt. % of 4-(nonyloxy)-2,3-difluorobenzoic acid p-[trans-4-[(R)-2-fluorohexanoyloxy]cyclohexyl]phenyl ester,
4.33 wt. % of 5-nonyl-2-(4-[(trans-4-[(R)-2-fluorohexanoyloxy]cyclohexyl)methoxy]phenyl)pyrimidine, 7.46 wt. % of 4-(decyloxy)benzoic acid p-[2-(trans-4-pentylcyclohexyl)ethyl]phenyl ester, 7.30 wt. % of 4-(dodecyloxy)benzoic acid p-[2-(trans-4-pentylcyclohexyl)ethyl]phenyl ester, 13.02 wt. % of 4-(dodecyloxy-2-fluorobenzoic acid p-[2-(trans-4-pentylcyclohexyl)ethyl]phenyl ester; $S_{C^*}$-$S_A$ 59° C., $S_A$-N* 68° C., cl.p. (N*-I) 87° C.; $\tau = 300$ μs.

The use of the comparatively low-viscosity, trinuclear $S_C$-components of the 4-(alkoxy)benzoic acid p-[2-(trans-4-alkylcyclohexyl)ethyl]phenyl ester type in place of compounds in accordance with the invention gives, in comparison to Mixture E, a lower phase transition $S_C^*$-$S_A$ and a longer switching time.

We claim:

1. A compound of formula

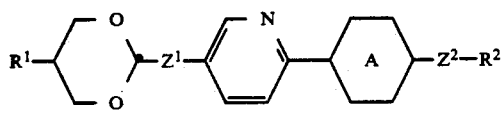

wherein $R^1$ is $C_1$-$C_{16}$ alkyl or $C_2$-$C_{16}$ alkenyl; $Z^1$ denotes a single covalent bond or —CH$_2$CH$_2$—; ring A represents 1,4-phenylene, the 1,4-phenylene being unsubstituted or substituted with halogen, methyl, or halogen and methyl; $Z^2$ denotes a single covalent bond, oxygen, or —CH$_2$O—; and $R^2$ is $C_1$-$C_{16}$ alkyl or $C_2$-$C_{16}$ alkenyl, the alkyl or alkenyl each independently being unsubstituted or substituted with halogen.

2. A compound according to claim 1 of formula

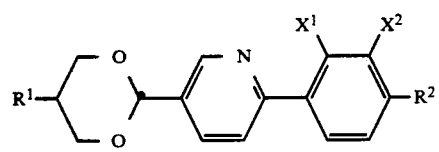

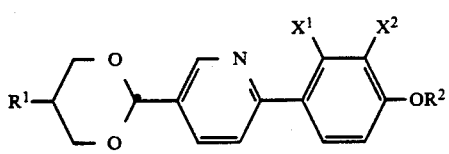

wherein $R^1$ and $R^2$ are as described in claim 1 and $X^1$ and $X^2$ each independently are hydrogen, halogen or methyl.

3. A compound according to claim 2, wherein $X^1$ and $X^2$ each independently are hydrogen or fluorine.

4. A compound according to claim 1 wherein $R^1$ has 3 to 14 carbon atoms.

5. A compound according to claim 4 wherein $R^1$ has 7 to 12 carbon atoms.

6. A compound according to claim 1 wherein $R^2$ has 3 to 12 carbon atoms.

7. A compound according to claim 6 wherein $R^2$ has 6 to 10 carbon atoms.

8. A compound according to claim 1 wherein $R^1$ is 1E-alkenyl, 3E-alkenyl, alkenyl with a terminal double bond or alkyl.

9. A compound according to claim 1 wherein $R^2$ is an unsubstituted or halogen substituted moiety selected from the group consisting of alkyl, 3E-alkenyl and alkenyl having a terminal double bond, and $Z^2$ is a single covalent bond.

10. A compound according to claim 1 wherein $R^2$ is an unsubstituted or halogen-substituted moiety selected from the group consisting of alkyl, 2E-alkenyl and alkenyl having a terminal double bond, and $Z^2$ is oxygen.

11. A compound according to claim 1 wherein $R^2$ is an unsubstituted or halogen-substituted moiety selected from the group consisting of alkyl and alkenyl having a terminal double bond, and $Z^2$ is —CH$_2$O—.

12. A liquid crystalline composition having at least two components, wherein at least one component is a compound of formula

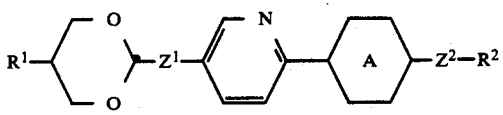

wherein $R^1$ is $C_1$-$C_{16}$ alkyl or $C_2$-$C_{16}$ alkenyl; $Z^1$ denotes a single covalent bond or —CH$_2$CH$_2$—; ring A represents 1,4-phenylene, the 1,4-phenylene being unsubstituted or substituted with halogen, methyl, or halogen and methyl; $Z^2$ denotes a single covalent bond, oxygen or —CH$_2$O—; and $R^2$ is $C_1$-$C_{16}$ alkyl or $C_2$-$C_{16}$ alkenyl, the alkyl or alkenyl each independently being unsubstituted or substituted with halogen.

* * * * *